Patented Feb. 4, 1941

2,230,966

UNITED STATES PATENT OFFICE 2,230,966

STABILIZED HIGH BOILING PETROLEUM FRACTIONS

Ebenezer Emmet Reid, Baltimore, Md., and Lyle A. Hamilton, Wenonah, N. J., assignors to Socony-Vacuum Oil Company, Incorporated, New York, N. Y., a corporation of New York No Drawing. Application December 29, 1939, Serial No. 311,472

13 Claims. (Cl. 252—45)

Refined petroleum oils tend to form acidic oxidation products during use, especially when subjected to elevated temperatures. These acids are so detrimental for many uses of the oils that when the concentration of acid bodies becomes sufficiently high the oils must be withdrawn from service to prevent actual damage to equipment. Thus an oil which is used in a transformer may have its electrical properties so modified by the formation of these acid bodies that its continued use will damage the transformer. Similarly a motor oil in which an excessive amount of such acidic bodies have formed, may corrode the engine bearings to such an extent as to cause bearing failure.

Numerous materials have been suggested which will retard acid formation in various types of oils, but few types have been found which succeed in lengthening the period of service of such widely different petroleum products as transformer oils and motor oils.

This invention is directed to the stabilization, or inhibition, of such oils against deterioration arising from the formation of acidic and/or sludge products, usually spoken of as deterioration due to oxidation.

This invention has for its object the protection of high boiling mineral oil fractions, of certain classes hereinafter pointed out, against oxidation, by the addition thereto of small amounts of poly thio poly alkylene glycols or derivatives thereof.

We have discovered that the compounds of a class which may be designated as thio substituted alkyl thio ethers are effective stabilizers for certain petroleum products.

These thio substituted alkyl thio ethers are compounds of the general formula

R'(SCR$_2$(CR$_2$)$_n$)$_x$S((CR$_2$)$_m$CR$_2$S)$_y$R' wherein R represents hydrogen or an alkyl radical, wherein R' represents hydrogen, or an alkyl, or aryl, or an alkaryl radical (both R' need not be the same), and wherein $m$, $n$, $x$, and $y$ are whole numbers.

Those members of this class which may be designated as poly thio poly ethylene glycols are most readily available and have been used as our examples but other members of the series may be prepared by substituting the desired alkylene dichloride for ethylene dichloride in the following preparations.

The poly thio poly ethylene glycols may be prepared by reacting sodium sulfide with ethylene dichloride, neutralizing the resulting mixture of poly thio poly ethylene glycols and separating by distillation, during which process compounds of the type R(SCH$_2$(CH$_2$)$_n$S)R may be removed.

Na$_2$S+ClCH$_2$CH$_2$Cl→
   NaSCH$_2$CH$_2$SNa+
   NaSCH$_2$CH$_2$SCH$_2$CH$_2$SNa+
   Na(SCH$_2$CH$_2$)$_x$S(CH$_2$CH$_2$S)$_y$Na
   di-sodium mercaptides NaSCH$_2$CH$_2$SNa+2HCl→HSCH$_2$CH$_2$SH+2NaCl NaSCH$_2$CH$_2$SCH$_2$CH$_2$SNa+2HCl→
   HSCH$_2$CH$_2$SCH$_2$CH$_2$SH+2NaCl Na(SCH$_2$CH$_2$)$_x$S(CH$_2$CH$_2$S)$_y$Na+2HCl→
   di-sodium mercaptides
   H(SCH$_2$CH$_2$)$_x$S(CH$_2$CH$_2$S)$_y$H+2NaCl
   poly thio poly glycols The various thio ethers may be prepared by reacting the di-sodium mercaptides of the poly thio poly ethylene glycols with the desired alkyl halide or sulfate.

Na(SCH$_2$CH$_2$)$_x$S(CH$_2$CH$_2$S)$_y$Na+2RX→
   R(SCH$_2$CH$_2$)$_x$S(CH$_2$CH$_2$S)$_y$R+2NaX

Other methods are reported in the literature by which materials of the general class above disclosed may be prepared. We wish to claim these compounds and all possible mixtures of them, without regard or limitation as to the method of preparation.

These compounds are both cheap and easy to prepare. They are uniformly effective in small amounts in inhibiting the oxidation of highly acid refined oils and in preventing corrosion of alloy bearings by solvent refined motor oils. They are effective stabilizers for wax. They show little or no effect in stabilizing moderately acid refined or solvent refined turbine oils, except perhaps in isolated instances.

In the following tests, B, B' di mercapto di ethyl sulfide (tri thio di ethylene glycol) and B, B' di butyl thio di ethyl sulfide (di butyl ether of tri thio di ethylene glycol) are used as representatives of our new class of compounds. These compounds have been tested for their stabilizing action with the following results.

*Example I.*—A very highly refined oil of the type suitable for use in transformer was used. This had a specific gravity of 0.871, a flash point of 310° F. and a Saybolt viscosity of 69 seconds at 100° F. Tests were made by heating the oil samples to 120° C. and bubbling oxygen gas through them for 70 hours. Neutralization numbers were then obtained on the samples as an indication of the amount of acids formed.

|  | Conc. percent | Neut. No. |
|---|---|---|
| Blank oil | | 25.0 |
| Blank oil+B,B' di mercapto di ethyl sulfide (HSCH$_2$CH$_2$)$_2$S | .10 | 0.00 |
| Blank oil+B,B' di butyl thio di ethyl sulfide (BuSCH$_2$CH$_2$)$_2$S | .10 | .01 |

*Example II.*—Motor oils, especially those refined by certain solvent extraction methods, tend to oxidize when submitted to high temperatures and form products that are corrosive to metal bearings. This corrosive action may be quite severe with certain bearings such as those made by cadmium and silver alloys, and may cause their failure within a comparatively short time.

The following test was used to determine the corrosive action of a motor oil on an automotive connection rod bearing.

A section of a bearing containing a cadmium silver alloy surface and weighing about 6.0 grams was put in 30 grams of a commercial S. A. E. 20 oil. The oil was heated to 175° C. for 22 hours while a stream of air was bubbled against the surface of the bearing. The loss in weight of the bearing during this treatment measures the amount of corrosion that has taken place. The following results were thus obtained. In each case a sample of the oil containing a stabilizer was run at the same time as a sample of the straight oil. The loss in weight of the bearing in the inhibited sample of oil can thus be compared directly against the loss in weight of the bearing in the corresponding uninhibited sample.

| Compound added | Conc. percent | Mg. loss in weight | |
|---|---|---|---|
| | | Inhibited | Uninhibited |
| B,B'di mercapto di ethyl sulfide | .25 | 1 | 54 |
| B,B' di butyl thio di ethyl sulfide | .25 | 2 | 54 |

*Example III.*—Samples of a refined paraffin wax, melting point 126–128° F., were heated to 120° C. for 70 hours with oxygen gas bubbling thru them and then tested for acidity in terms of N. N. values.

| | N. N. |
|---|---|
| Paraffin wax alone | 24.7 |
| With 0.10% B,B' di mercaptodiethylsulfide | 0.01 |
| With 0.10% B,B' dibutyl thio diethylsulfide | 0.01 |

These materials may be used in varying amounts, depending upon the nature of the oil and the amount of inhibitor desired. In general, useful results may be obtained by the use of from about .01 to about 1.0 weight percent of the material in the oil, with a preferred concentration of the order of about .25 weight percent.

While, as disclosed herein, the members of the group as a whole are possessed of inhibitive capabilities, preference is had for those members whose constitution is such as to promote suitable solubility in the oils, etc., to be inhibited. In general, preference is had for those compounds of a generally aliphatic nature, typified by the alkyl substituted thio ethers of thio glycols, wherein the alkyl substituents are of relatively low molecular weight.

We claim:

1. A high boiling petroleum fraction of the group consisting of highly refined lubricant oils, solvent refined motor oils, and wax, stabilized against oxidation by the addition thereto of a small amount of a material of the general formula $$R'(SCR_2(CR_2)_n)_xS((CR_2)_mCR_2S)_yR'$$

where an R indicates a member of the group hydrogen and alkyl, an R' represent a member of the group hydrogen, alkyl, alkaryl, and aryl, wherein $m$, $n$, $x$, and $y$ are whole numbers.

2. A high boiling petroleum fraction stabilized against oxidation by the addition thereto of a small amount of a thio substituted alkyl thio ether.

3. A high boiling petroleum fraction stabilized against oxidation by the addition thereto of a small amount of a poly thio poly alkylene glycol.

4. A solvent refined motor lubricant oil stabilized against the formation of acidic constituents by the incorporation therein of a small amount, from about 0.01 to about 1.0 weight percent of a thio substituted alkyl thio ether.

5. A solvent refined motor lubricant oil stabilized against the formation of acidic constituents by the incorporation therein of a small amount, from about 0.01 to about 1.0 weight percent, of a poly thio poly alkylene glycol.

6. A highly acid refined petroleum lubricant oil stabilized against oxidation by the incorporation therein of a small amount, from about 0.01 to about 1.0 weight percent of a thio substituted alkyl thio ether.

7. A highly acid refined petroleum lubricant oil stabilized against oxidation by the incorporation therein of a small amount, from about 0.01 to about 1.0 weight percent, of a poly thio poly alkylene glycol.

8. A petroleum wax stabilized against oxidation by the incorporation therein of a small amount, from about 0.01 to about 1.0 weight percent of a thio substituted alkyl thio ether.

9. A petroleum wax stabilized against oxidation by the incorporation therein of a small amount, from about 0.01 to about 1.0 weight percent, of a poly thio poly alkylene glycol.

10. A solvent refined motor lubricant oil stabilized against the formation of acidic constituents by the incorporation therein of a small amount, from about .01 to about 1.0 weight percent of a material of the general formula $$R'(SCR_2(CR_2)_n)_xS((CR_2)_mCR_2S)_yR'$$

where an R indicates a member of the group hydrogen and alkyl, and R' represent a member of the group hydrogen, alkyl, alkaryl and aryl, wherein $m$, $n$, $x$ and $y$ the whole numbers.

11. A solvent refined motor lubricant oil stabilized against the formation therein of acidic constituents by the addition of a small amount, from about .01 to about 1.0 weight percent, of a material from the group tri thio di ethylene glycol and di butyl ether of tri thio di ethylene glycol.

12. A solvent refined motor oil stabilized against formation of corrosive products of oxidation by the addition thereto of a small amount, of the order of about .25 weight percent, of a material of the general formula $$R'(SCR_2(CR_2)_n)_xS((CR_2)_mCR_2S)_yR'$$

where an R indicates a member of the group hydrogen and alkyl, and R' represents a member of the group hydrogen, alkyl, alkaryl and aryl, wherein $m$, $n$, $x$ and $y$ are whole numbers.

13. A solvent refined motor oil, stabilized against formation of corrosive products of oxidation by the addition of a small amount, of the order of about .25 weight percent, of a material selected from the group tri thio di ethylene glycol and di butyl ether of tri thio di ethylene glycol

EBENEZER EMMET REID.
LYLE A. HAMILTON.